(12) United States Patent
Gaffney

(10) Patent No.: US 7,730,661 B2
(45) Date of Patent: Jun. 8, 2010

(54) DOUBLE-ENDED FISHING LEADER WITH FREE-SLIDING HOOK(S)

(76) Inventor: James R. Gaffney, 41544 Farrell Dr., Clayton, NY (US) 13624

(*) Notice: Subject to any disclaimer, the term of this patent is extended or adjusted under 35 U.S.C. 154(b) by 148 days.

(21) Appl. No.: 11/543,667

(22) Filed: Oct. 5, 2006

(65) Prior Publication Data

US 2007/0079543 A1   Apr. 12, 2007

Related U.S. Application Data

(60) Provisional application No. 60/725,844, filed on Oct. 12, 2005.

(51) Int. Cl.
*A01K 83/06* (2006.01)
*A01K 83/00* (2006.01)

(52) U.S. Cl. .......... 43/44.2; 43/44.4; 43/44.8; 43/44.83; 43/44.84; 43/44.85; 43/43.15; 43/43.1

(58) Field of Classification Search ........ 43/43.16, 43/44.82, 44.83, 44.84, 44.85, 43.1, 44.2, 43/44.4, 44.8, 42.74, 43.15

See application file for complete search history.

(56) References Cited

U.S. PATENT DOCUMENTS

| | | | | | |
|---|---|---|---|---|---|
| 1,163,244 | A | * | 12/1915 | Lawrence | 43/44.2 |
| 1,386,061 | A | * | 8/1921 | Johnson | 43/44.4 |
| 1,720,287 | A | * | 7/1929 | Moore | 43/43.15 |
| 2,033,701 | A | * | 3/1936 | Gibbs | 43/43.15 |
| 2,170,788 | A | * | 8/1939 | Augenblick | 43/42.74 |
| 2,218,946 | A | * | 10/1940 | Barnett | 43/44.84 |
| 2,225,135 | A | * | 12/1940 | Skoverski | 43/44.85 |
| 2,227,420 | A | * | 1/1941 | Augenblick | 43/44.85 |
| 2,315,295 | A | * | 3/1943 | Stogermayr | 43/42.74 |
| 2,382,677 | A | * | 8/1945 | Thomas | 43/43.15 |
| 2,482,901 | A | * | 9/1949 | Cianfrone | 43/44.85 |
| 2,494,620 | A | * | 1/1950 | Johnson | 43/44.84 |
| 2,540,713 | A | * | 2/1951 | Crook | 43/42.74 |
| 2,553,895 | A | * | 5/1951 | Carter | 43/44.2 |
| 2,576,880 | A | * | 11/1951 | Jensen | 43/43.15 |
| 2,591,764 | A | * | 4/1952 | Allen | 43/44.8 |
| 2,603,026 | A | * | 7/1952 | Duty | 43/44.2 |
| 2,636,307 | A | * | 4/1953 | Mason et al. | 43/44.83 |
| 2,665,516 | A | * | 1/1954 | Race | 43/42.51 |
| 2,700,242 | A | * | 1/1955 | Porth | 43/44.4 |
| 2,728,162 | A | * | 12/1955 | Jones | 43/44.85 |

(Continued)

FOREIGN PATENT DOCUMENTS

CH    612576 A5 *  8/1979

(Continued)

*Primary Examiner*—Darren W Ark
(74) *Attorney, Agent, or Firm*—Bernhard P. Molldrem, Jr.

(57) ABSTRACT

A leader and fish hook combination has eyes or loops formed at both ends of the leader so that the leader can be attached to the fishing line with either the one eye or the other. The fish hook, or more than one fish hook, has the leader threaded through the eye end of the fish hook. The leader passes through the eye of each hook, but is not tied to it, leaving the hook free to slide along the leader. Fastened one way, the hook is presented outward, and if fastened or tied off the other way, the hook presented inward. In that orientation, the lower eye projects over the hook portion so the rig serves as a weedless hook.

16 Claims, 4 Drawing Sheets

U.S. PATENT DOCUMENTS

| | | | | |
|---|---|---|---|---|
| 2,732,652 A * | 1/1956 | Parks | ......................... | 43/44.83 |
| 2,763,955 A * | 9/1956 | Mead | ......................... | 43/42.74 |
| 2,766,547 A * | 10/1956 | Gallagher | ................. | 43/42.74 |
| 2,792,663 A * | 5/1957 | Sinclair | ..................... | 43/43.15 |
| 2,808,678 A * | 10/1957 | Leonardi | .................... | 43/44.8 |
| 2,835,069 A * | 5/1958 | Flye, Sr. | ..................... | 43/44.84 |
| 2,848,835 A * | 8/1958 | Witt | ......................... | 43/42.74 |
| 2,854,781 A * | 10/1958 | Scozzari | .................... | 43/44.2 |
| 2,908,989 A * | 10/1959 | Povinelli et al. | ........... | 43/42.74 |
| 2,929,168 A * | 3/1960 | Furuto | ....................... | 43/44.84 |
| 2,977,710 A * | 4/1961 | Stambaugh | ................. | 43/44.2 |
| 3,140,520 A * | 7/1964 | Marino et al. | .............. | 43/43.15 |
| 3,164,922 A * | 1/1965 | Kearns et al. | ............... | 43/43.15 |
| 3,218,752 A * | 11/1965 | Zielaskowski | .............. | 43/44.2 |
| 3,327,423 A * | 6/1967 | Kotis | .......................... | 43/44.2 |
| 3,435,552 A * | 4/1969 | Caldwell | ................... | 43/43.15 |
| 3,464,140 A * | 9/1969 | Carabasse | .................. | 43/42.74 |
| 3,468,053 A * | 9/1969 | Lux | ............................ | 43/43.1 |
| 3,491,477 A * | 1/1970 | Karras et al. | ............... | 43/44.84 |
| 3,535,815 A * | 10/1970 | Lowndes | .................. | 43/44.85 |
| 3,605,319 A * | 9/1971 | Griffithm | ................... | 43/43.15 |
| 3,736,691 A * | 6/1973 | Gist | ........................... | 43/44.8 |
| 4,184,280 A * | 1/1980 | Friend | .......................... | 43/4.5 |
| 4,569,148 A * | 2/1986 | Kemp | ......................... | 43/43.1 |
| 4,688,347 A * | 8/1987 | Krogmann | ................... | 43/44.8 |
| 4,729,187 A * | 3/1988 | DiGioia | ..................... | 43/44.98 |
| 4,793,091 A * | 12/1988 | Cerny | ........................ | 43/42.74 |
| 4,825,585 A * | 5/1989 | Lefebvre | ..................... | 43/27.4 |
| 4,837,964 A * | 6/1989 | Aleckson | .......................... | 43/4 |
| 4,850,132 A * | 7/1989 | Motyka | ...................... | 43/44.2 |
| 4,870,777 A * | 10/1989 | Morita | ...................... | 43/42.74 |
| 4,888,910 A * | 12/1989 | Lewis | ........................ | 43/44.82 |
| 5,022,178 A * | 6/1991 | Carlson | ..................... | 43/44.82 |
| 5,063,704 A * | 11/1991 | Phillips | ...................... | 43/44.83 |
| 5,083,394 A * | 1/1992 | Harwig | ....................... | 43/43.16 |
| 5,113,614 A * | 5/1992 | Morita | ....................... | 43/42.74 |
| 5,369,905 A * | 12/1994 | DeMars | .................... | 43/42.74 |
| 5,664,365 A * | 9/1997 | Walden | ...................... | 43/44.82 |
| 5,771,625 A * | 6/1998 | Savaglia | .................... | 43/42.74 |
| 5,881,490 A * | 3/1999 | Richardson | ................. | 43/44.2 |
| 5,950,348 A * | 9/1999 | Gruel | ......................... | 43/43.15 |
| 6,006,468 A * | 12/1999 | Hnizdor | ..................... | 43/44.83 |
| 6,141,900 A * | 11/2000 | Rudolph | ..................... | 43/44.8 |
| 6,282,831 B1 * | 9/2001 | Hugunin et al. | .............. | 43/44.8 |
| 2006/0026892 A1* | 2/2006 | Nakamichi | ................. | 43/44.85 |
| 2008/0256841 A1* | 10/2008 | DeSpiegelaere | ............ | 43/44.2 |

FOREIGN PATENT DOCUMENTS

| | | | |
|---|---|---|---|
| FR | 2609365 | A1 * | 7/1988 |
| FR | 2625408 | A1 * | 7/1989 |
| FR | 2796809 | A1 * | 2/2001 |
| FR | 2840156 | A1 * | 12/2003 |
| JP | 11169039 | A * | 6/1999 |
| JP | 2001037374 | A * | 2/2001 |
| JP | 2001157530 | A * | 6/2001 |

* cited by examiner

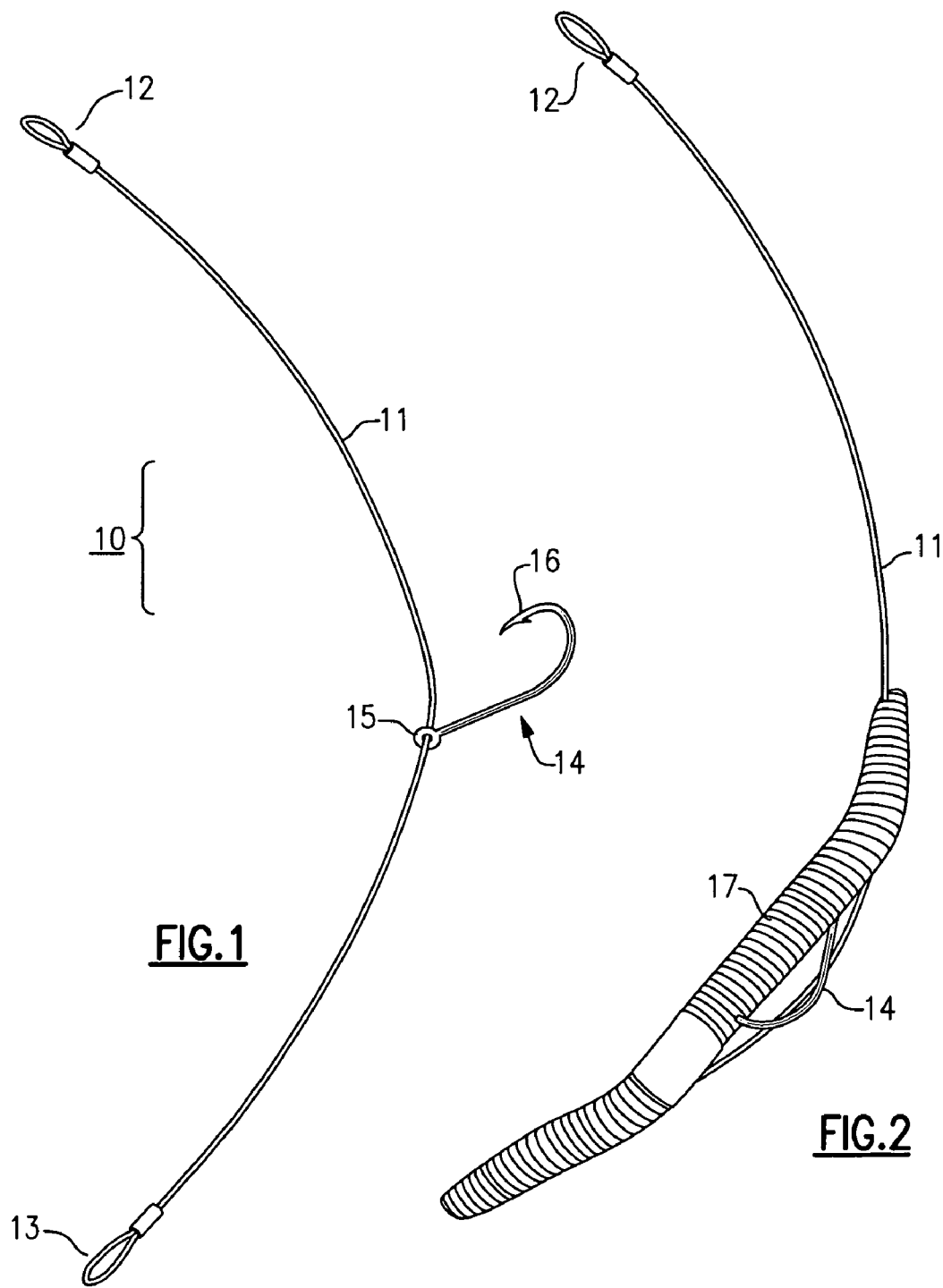

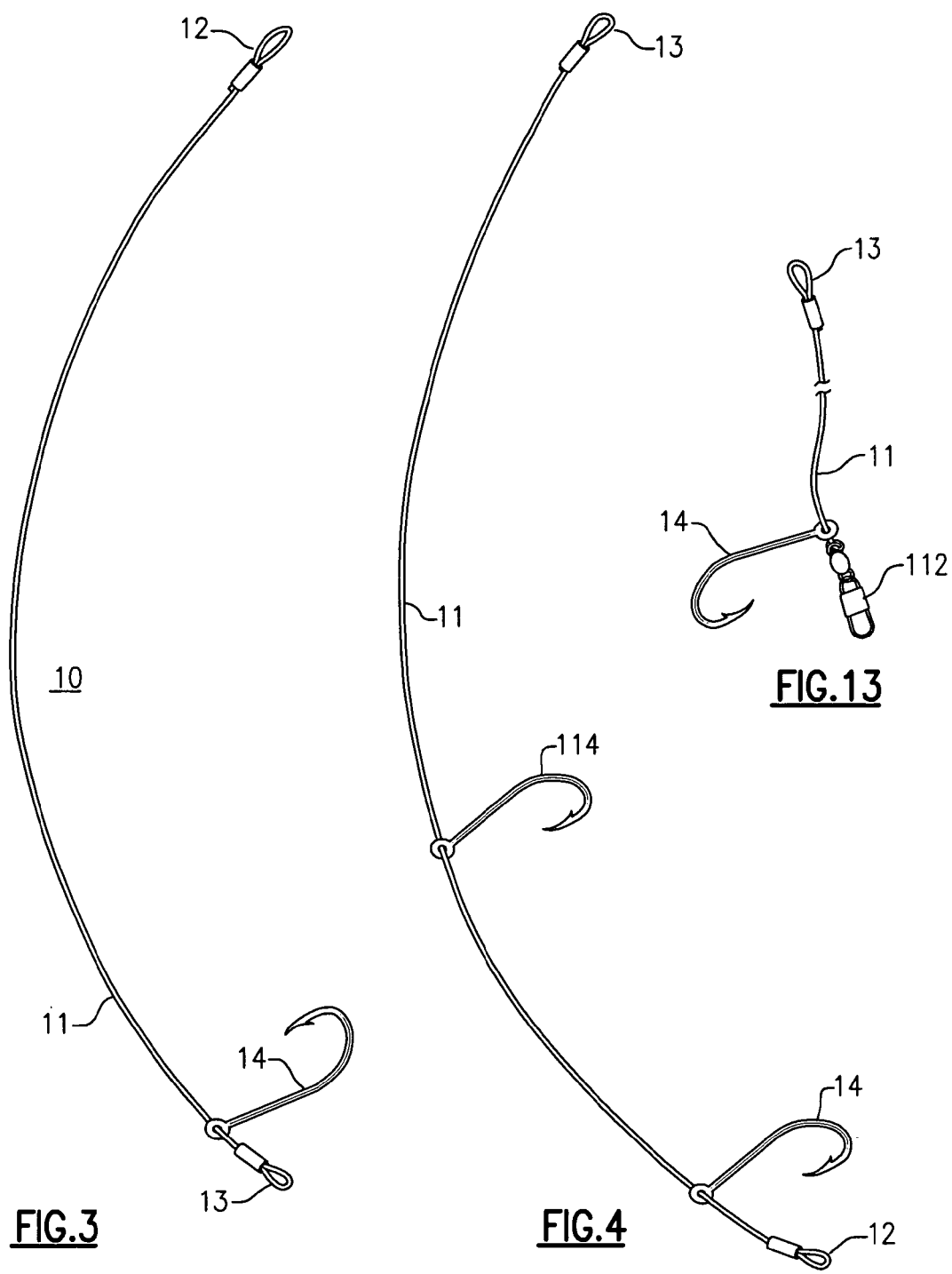

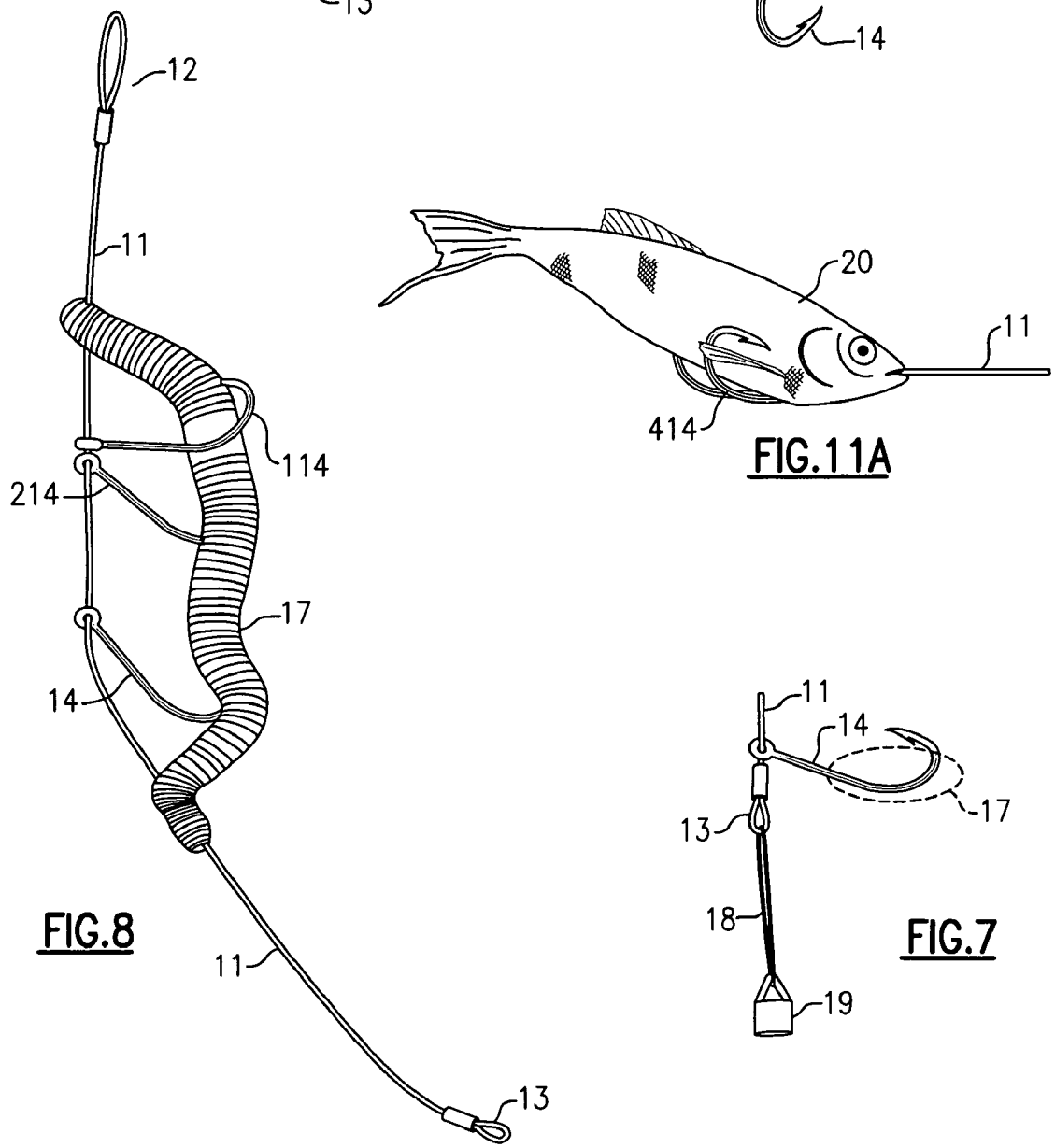

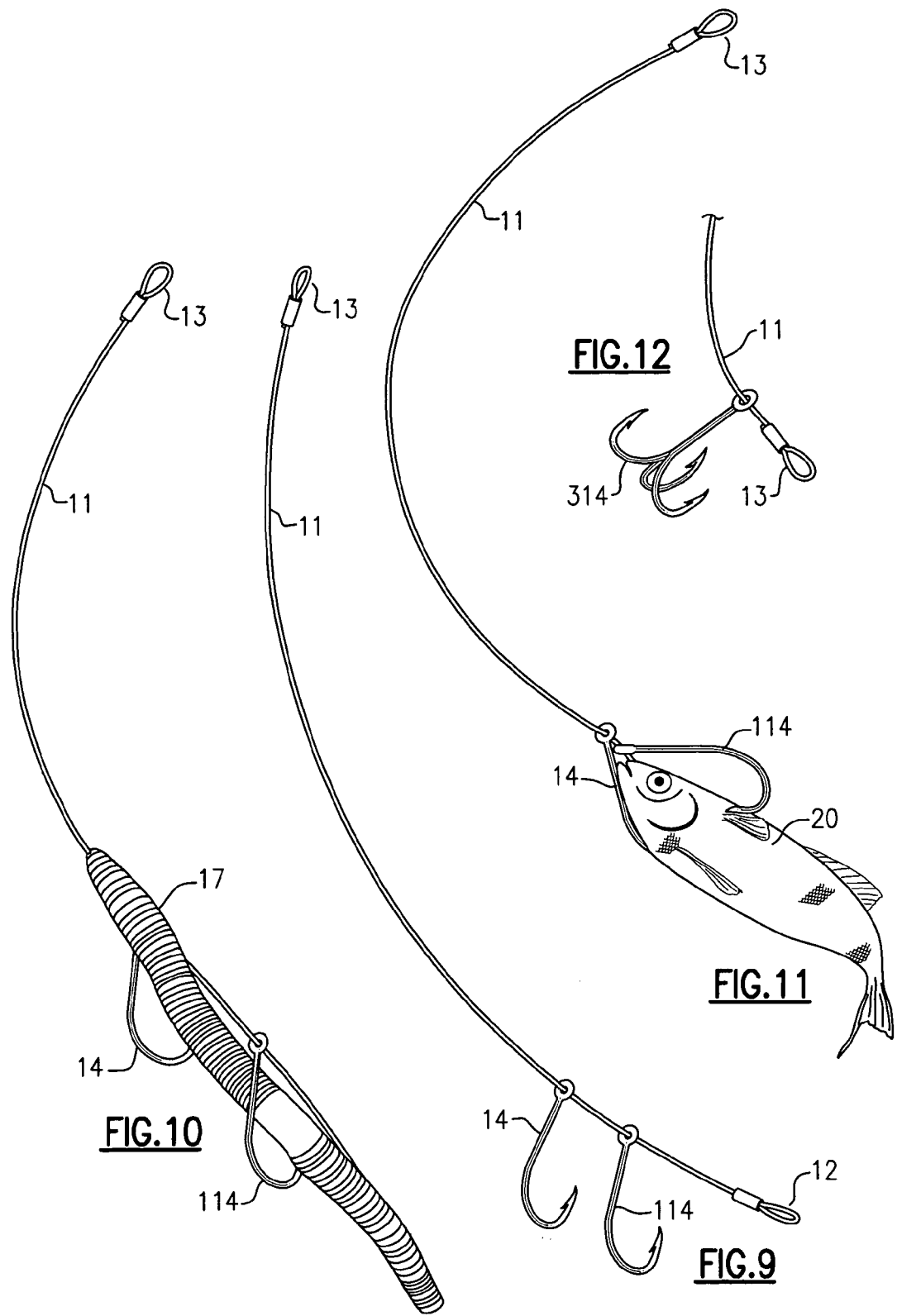

DOUBLE-ENDED FISHING LEADER WITH FREE-SLIDING HOOK(S)

Applicant claims priority of Provisional U.S. Application 60/725,844, filed Oct. 12, 2005, which is incorporated herein by reference.

BACKGROUND OF THE INVENTION

This invention relates to fishing tackle, such as fish hooks and leaders, and is more specifically directed to a combination of a leader that has loops or eyes formed at each end, and a fish hook having an eye that is free sliding along the leader between the two ends.

The common practice is to employ a fishing leader that ties to the end of a fishing line, with a fishhook tied or clipped onto one end of the leader. Snelled hooks are frequently used, in which an eye or loop is formed at one end of a fishing leader, and the fishhook is tied onto the other end of the leader. This typically involves passing the leader through the eye of the hook, and then tying a fisherman's knot to secure the hook to the leader.

This type of system has rather limited flexibility, and normally the fisherman has to keep on hand a variety of snelled hooks to use in different fishing conditions. Also, the hook is always presented at the very end of the leader, so the hook hangs down, limiting the number of ways that the hook and any bait it carries can be presented to the fish. Also, with conventional snelled fish hooks, it is difficult to clip on additional line and a sinker for holding the bait and hook off the bottom when bottom fishing.

OBJECTS AND SUMMARY OF THE INVENTION

Accordingly, it is an object of this invention to provide a fishing leader and tackle combination that increases its usefulness over the fishing tackle of the prior art.

It is another object to provide a leader and hook combination that can be attached onto the fishing line two opposite ways so that the fish hook can be presented to the fish in different ways.

It is a further object to provide a leader and hook combination that can be used without sinkers or additional weights, and which can be used for jigging or for fishing in weeds.

In accordance with an aspect of the present invention, a leader and fish hook combination employs a fishing leader, which can preferably be a steel wire, which has eyes or loops formed at its two ends, so that the leader can be attached with either one eye or the other fastened to the end of the fishing line. A fish hook, or more than one fish hook, is slidably positioned on the leader between the two eyes. The (or each) hook has an eye at one end of its shaft and a curved hook at the other end. The leader passes through the eye of each hook, but is not tied to it, so that the hook can slide along the leader. If this arrangement is fastened to the fish line by tying to one eye, the hook is presented outward, and if fastened or tied off at the other eye, the hook is presented inward. Having the hook presented outwards makes the rig suitable for jigging and bottom fishing. With the hook presented inwards, the rig can be used for fishing or casting in weeds. The lower eye projects over the hook portion so the rig serves as a weedless hook. The rig can be used with live or artificial bait. The loop at the end can be used like a needle to thread through the bait, which can be live, i.e., minnow, earthworm, frog, etc., or can be an artificial (plastic) worm or other article.

For many applications, the leader can be a monofilament nylon. There can be a single hook or several hooks together on the leader. Also, because of the free-moving hooks there is less resistance on the bait itself, but this does not interfere with the fisherman setting the hook when a fish takes the bait or when the fish nibbles at it. The bait has a more realistic appearance when presented to the fish, which increases the attractiveness. The rig can hook the fish on the inside or outside of the jaw.

Where the rig has a steel wire leader, the weight of the leader is usually enough to cause the hook and bait to sink without requiring additional weights or sinkers. This avoids the need for lead sinkers, which can be an environmental hazard if they become detached from the line. The coated steel leader rig is often preferred for its extra strength, especially with northern pike, pickerel or muskellunge, which can easily bite through a nylon leader.

The eyes at the end of the leader can be simple loops, or can include a swivel clip. Treble hooks or other multiple hooks can be used.

The above and many other objects, features, and advantages of this invention will become apparent to persons skilled in the art from the ensuing description of a preferred embodiment, which is to be read in conjunction with the accompanying Drawing.

BRIEF DESCRIPTION OF THE DRAWING

FIG. 1 is shows one example of the rig, i.e., leader and hook combination, according to one embodiment of this invention.

FIG. 2 shows the rig of this embodiment with an artificial (plastic) worm.

FIG. 3 shows the rig of this embodiment reversed, with the hook presented outwards.

FIG. 4 shows another embodiment in which there are two fish hooks slidable positioned on the leader.

FIG. 5 shows the lower end of the rig and hook, for outward presentation.

FIG. 6 shows the lower end of the rig and hook (attached the opposite way) for inward, i.e., weedless, presentation.

FIG. 7 illustrates the possibility of connecting an additional line and weight to the lower eye loop.

FIG. 8 shows the rig with multiple hooks and employing an artificial worm.

FIG. 9 shows an embodiment with two fishhooks.

FIG. 10 shows the embodiment of FIG. 9 with a plastic worm attached as bait.

FIG. 11 shows the embodiment of FIG. 9 with a live minnow attached as bait.

FIGS. 12 and 13 illustrate some possible variations.

DETAILED DESCRIPTION OF THE PREFERRED EMBODIMENT

With reference to the Drawing, and initially to FIG. 1 thereof, a single-hook rig 10 according to one embodiment of the invention is formed of a wire leader 11 of suitable length, e.g., eight to twelve inches, with a loop eye 12 formed at one end and another loop eye 13 formed at the other end. A fish hook 14 is slidable on the wire leader 11 between the two eye loops. The fish hook 14 has a shank with an eye 15 at one end and a hook portion at the other. The eye 15 is threaded onto the wire leader, but not tied, so the hook is normally free to slide between the two ends of the rig.

As shown in FIG. 2, an artificial earthworm 17 or other item of bait can be supported on the rig 10, both on the hook 14, here shown passing through the bait, and by means of the lower end of the rig, with the lower eye 13 (not seen here) also being threaded into the bait. This arrangement can provide a stable, realistic presentation of the bait to the fish.

In FIG. 3, the rig 10 is shown with the hook 14 configured outwardly, i.e., with the hook point being oriented upwards and with the hook on the leader 11 with the shank portion down against the lower loop eye 13.

In FIG. 4, the rig 10 is inverted end for end, so that the hook 14 is slid down against the other loop eye 12, which is now beneath the hook. This orients the hook 14 inwardly, i.e., with the hook point down. FIG. 4 also illustrates that a second hook 114 can also be slidably mounted onto the leader 11, with the leader threaded through the eye of the second hook 114.

FIG. 5 shows the rig with the hook 14 presented outwardly, on the leader 11 against the loop eye 13, i.e., with the hook point up and with the shank extending to the side. FIG. 6 shows the rig inverted with the eye of the hook 14 on the leader 11 against the loop eye 12. This orients the hook 14 so the point is below the loop eye 12. Here the loop eye protects the hook from weeds, and in this orientation the rig can be used favorably for casting into weedy areas.

With the outward presentation as shown in FIG. 7, an additional length of line 18 can be added, tied to the loop eye 13 and supporting a weight or sinker 19. This allows the hook 14 to be supported above the bottom when the weight 19 is resting on the bottom, and can be used for jigging with the hook 14 and bait 17 (here shown generically, in ghost).

FIG. 8 shows an arrangement of the rig of this invention with a group of hooks, i.e., a multiple of hooks 14, 114, 214, etc., all slidable fitted onto the leader 11 between the two eye loops 12, 13. Here the plastic worm 17 (or other bait) is supported on the three fish hooks 14, 114, 214, and the lower eye loop 13 is also threaded through it.

A plural-hook rig with two fish hooks 14, 114, and inverted so that the hooks are presented inwardly, is shown in FIG. 9. This can be used with an artificial bait such as a plastic earthworm 17 as shown in FIG. 10, or can be used with live bait such as a live minnow 20, as shown in FIG. 11. In either case, the points of the hooks are placed into the bait and the loop eye 12 (obscured in FIGS. 10 and 11) is threaded through the bait 17 or 20. In the case of the live bait, i.e. minnow, the loop end of the leader position is threaded through the mouth and one gill, so as not to injure the minnow, and with one of the hooks being set only lightly onto the minnow. This technique preserves the bait, so the minnow remains alive much longer than if pierced with the fish hook.

Another technique for using this rig is shown in FIG. 11A, where the leader 11 is threaded through the gill and out the mouth of the minnow or other bait 20, and with the hooks 414 being on one side (or both sides) of the bait, and attached to the leader. In this example, the hook 414 is a double hook, and has a hook lying on each side of the minnow behind the gills. This technique does not injure the minnow, so the bait stays alive longer. This technique can be used with artificial bait or with other forms of live bait as well.

The rig 10 is distinctive over the prior art for the two differences mentioned before. The hook or hooks 14, 114, etc., are not tied onto the leader, but rather they slide along the leader 11. Secondly, there is a loop 12, 13 at each end of the leader, so the rig can be tied or clipped onto the fish line using either the eye loop 12 or the eye loop 13. These two factors make the rig 10 useful for fishing under almost all the fishing conditions that are likely to be encountered: deep water, shallow water, bedrock, weed beds, still water or running water.

The rig 10 can have a single hook 14 or multiple hooks, and can be used with live or artificial bait, and can be used for casting, still fishing, trolling, or jigging. When tied off at one end, the rig presents the hook outward for jigging and bottom fishing, and when tied off at the other end, the rig presents the hook or hooks inward, for weedless use, i.e., casting into weed beds.

The rig 10 in this embodiment has a steel wire leader 11, which is coated. This is preferred for its versatility and strength, especially when used for walleye, northern pike, pickerel, or muskie. Also with the wire leader, the lower eye and leader material can be easily threaded, like a needle, through the live or artificial bait. The weight of the steel leader 11 provides sufficient weight to cause the hook and bait to sink gradually, and this avoids the need for sinkers or lead weights, which can be an environmental hazard when the lead weights fall or break off the line. Under most fishing conditions, e.g., slow weedless fishing, the weight of the leader is usually enough. When extra weight is necessary, the weight can be tied onto the far loop eye.

On the other hand, in many applications, the rig can be made with a monofilament leader, and that may be preferred for crappies or other pan fish. While the embodiments shown have single hooks, it is also possible to use multiple-ended or ganged hooks, e.g., treble hooks 314, slidably supported on the leader 11, as illustrated in FIG. 12. Another alternative that is shown in FIG. 13 is to have a swivel or clip 112 at one end in place of the free eye loop, but still have the hook or hooks 14 slidable on the leader between that and the other eye loop 13. Also, swivels or clips could be used at both ends in place of the simple eye loops at both ends.

Many alternative configurations would occur to those in the fishing tackle industry, which would take into account the main advantageous features of having the hook slide along the leader, and having the leader be invertible so that it can be tied to the line at either end.

The rig 10 of this invention is especially effective, because the rig becomes an extension of the line, and not simply an appendant to the line. There is no need for the hook or leader to be suspended from the side of the line, to become twisted and tangled around the main line. Also, the rig 10 offers less resistance on the bait itself, because of the free moving nature of the hook(s). When the fish attacks the bait, or just nibbles or tests it, the fish does not sense that the bait is tied to a line. This is important, because if the fish is suspicious of the bait, the fish may not take the bait, but if the fish seems real, the fish may take it. Once the fish is holding or biting the bait, the fisherman can set the hook. The rig 10 can set the hook on the outside of the jaw as easily as inside the mouth of the fish. These features make the rig 10 particularly versatile.

While the invention has been described in detail with respect to a preferred embodiment, it should be recognized that there are many alternative embodiments that would become apparent to persons of skill in the art. Many modifications and variations are possible which would not depart from the scope and spirit of this invention, as defined in the appended claims.

What I claim is:

1. A reversible fishing rig consisting of a flexible fish leader having first and second ends, with a first simple eye loop and a second simple eye loop formed at said first and second ends, respectively, such that each of said eye loops is open and free of any fish hook such that each eye loop is adapted to be attached to an end of a fish line, and a fish hook having a shank with an eye at one end and a hook portion at the other, opposing end, with the hook portion having a point, the eye being formed as a ring extending in a plane at said one end of the shank, and with the leader passing through the eye of the fish hook, so that the fish hook is freely slidable along said leader for an entire length thereof between the first and second eye loops, such that when the first eye loop is attached to the fish line, the hook is presented with the hook point up and with the shank extending to a side, and when the second eye loop is attached to the fish line, the hook is oriented with the shank downward and with the point below the first eye loop.

2. The fishing rig of claim 1, wherein said leader is a flexible wire leader.

3. The fishing rig of claim 2, wherein said leader is a coated wire leader.

4. The fishing rig of claim 1, wherein one of said eye loops is adapted to be threaded through a mouth and gill of a bait fish without injury to the bait fish.

5. The fishing rig of claim 1, wherein at least one of said eye loops is formed as a swivel clip.

6. A reversible fishing rig comprising a flexible fish leader having first and second ends, with a first simple eye loop and a second simple eye loop formed at said respective first and second ends, said first and second simple eye loops being open and each being free of any fish hook such that each of said first and second simple eye loops is adapted to be attached to an end of a fishing line, and a pair of fish hooks, each hook of said pair of fish hooks having a shank with an eye at one end and a hook portion at the other, opposing end, said hook portion having a point, each of the eyes being formed as a ring extending in a plane at said one end of the shank, with the leader passing through the eye of each of said fish hooks, so that the fish hooks are slidable along said leader for an entire length of the leader between the first and second eye loops, and such that when said first eye loop is attached to the fish line the hooks are presented with the hook points up and with the shanks extending to a side, and when the second eye loop is attached to said fish line, the hooks are oriented with the shanks downward and with the points below the first eye loop.

7. The fishing rig of claim 6, wherein said leader is a flexible wire leader.

8. The fishing rig of claim 7, wherein said leader is a coated wire leader.

9. The fishing rig of claim 6, wherein one of said eye loops is adapted to be threaded through a bait item.

10. The fishing rig of claim 6, wherein said pair of fish hooks is two and only two fish hooks.

11. A reversible fishing rig consisting of a flexible fish leader having first and second ends, with a first simple eye loop and a second simple eye loop formed at the respective first and second ends thereof, such that each said eye loop is open and free of any fish hook such that each said eye loop is adapted to be attached to an end of a fishing line, and a group of fish hooks, each hook of said group of fish hooks having a shank with an eye at one end and a hook portion at the other, opposing end, said hook portion having a point, each of the eyes being formed as a ring extending in a plane at said one end of the shank, with the leader passing through the eyes of said group of fish hooks, so that the group of fish hooks is freely slidable along said leader for an entire length thereof between the first and second eye loops and such that when the first eye loop is attached to the fish line, at least one hook of said group of fish hooks is presented with the respective hook point up and with the respective shank extending to a side, and when the second eye loop is attached to the fish line the at least one hook of said group of fish hooks is oriented with the respective shank downward and with the respective hook point below the first eye loop.

12. The fishing rig of claim 11, wherein said leader is a flexible wire leader.

13. The fishing rig of claim 11, wherein said leader is a coated wire leader.

14. The fishing rig of claim 11, wherein one of said eye loops is adapted to be threaded through a bait item.

15. The fishing rig of claim 11, wherein at least one of said eye loops is attached to a swivel clip.

16. The fishing rig of claim 11, wherein said group of fish hooks consists of two fish hooks.

* * * * *